United States Patent Office 3,084,996
Patented Apr. 9, 1963

3,084,996
METHOD OF REGENERATING THE FREE AND THE USED HYDROCHLORIC ACID FROM ALUMINIUM ETCHING BATHS
Andreas Hake, Vienna, Austria, assignor to Othmar Ruthner, Vienna, Austria
No Drawing. Filed July 5, 1961, Ser. No. 121,814
Claims priority, application Austria July 8, 1960
7 Claims. (Cl. 23—154)

In the manufacture of foils for condensers, aluminium foil is etched with hydrochloric acid or hydrochloric acid in mixture with other acids or salts. In this etching or pickling process, a considerable amount of metallic aluminium dissolves as aluminium chloride in the etching acid and hydrochloric aluminium-chloride-containing corrosives form which cannot be immediately discharged into the drains. They must first be destroyed, together with the unused hydrochloric acid still contained therein, by means of an expensive neutralisation process.

In the process forming the subject of the invention, a quantity of the hydrochloric aluminium-chloride-containing etching acid corresponding to the aluminium growth is taken from the etching bath and regenerated to form pure hydrochloric acid. The resultant hydrochloric acid flows back into the etching installation, so that when operation is carried out in accordance with the present method no corrosives occur and have to be destroyed.

The method is based on three stages.

In the first stage which is known per se the unused hydrochloric acid is distilled, condensed and, if necessary, the dilute aluminium chloride solution is intensively concentrated at the same time. In the second stage, according to the invention, the aluminium chloride solution which is now only weakly acid and, if required, concentrated is brought into reaction with subsequently produced aluminium oxide. The term aluminium oxide is used here and in the following description to describe aluminium sesquioxide, $Al_2O_3$. In these conditions it has surprisingly been found that a solid compound forms with considerable evolution of heat, this compound probably being in the form of an aluminium oxide chloride. According to the invention, this reaction product is roasted in the third stage with the application of heat, to form aluminium oxide and $HCl—H_2O$ gas. The latter is condensed to form hydrochloric acid and returned to the etching process together with the hydrochloric acid obtained in the first stage.

Some of the aluminium oxides produced during the roasting process serves in the second stage to bind the concentrated aluminium chloride solution and in this way continually passes through the roasting furnace. According to the amount of aluminium chloride supplied, the aluminium oxide obtained as final product from regeneration occurs in a quantity and with a purity corresponding to the metallic aluminium etched away.

The operations of the first stage, namely distillation of the hydrochloric acid and concentration of the aluminium chloride solution, are carried out in an industrially known manner, for example by means of a recycling or falling film evaporator, concentration of the dilute hydrochloric acid with the simultaneous extraction of water being possible in known manner in a connected distillation column, dephlegmator, and so on. Any other suitable distillation and rectifying devices may naturally be used for this process.

The second stage, the production of the solid aluminium chloride-oxide compound, may either be carried out simultaneously with the third stage in the roasting furnace or may alternatively be carried out separately in a suitable apparatus, for example a pelleting drum or plate. The hydrochloric-acid-containing water vapours occurring are sucked off and condensed to form aqueous hydrochloric acid either directly or together with the hydrochloric acid vapours produced in the other stages, or are mixed with the condensates.

The decomposition of the aluminium chloride into aluminium oxide, hydrochloric acid and water vapour begins at temperatures just above 100°. The higher the roasting temperature, the more rapid and complete the process. Generally, temperatures between 100 and 600° will be used, but higher roasting temperatures may be advantageous to the process.

Roasting may be carried out in any known roasting apparatus, for example in a directly or indirectly heated shelved roasting oven or rotary tubular oven. The oven is directly charged with solid reaction product produced in the second stage, while a bed of returned oxide may be advantageous at the entry. Alternatively, the liquid concentrated aluminium chloride solution may be introduced directly into an oxide bed in the oven and thus the reaction of the second stage, drying and roasting, be carried out in the same oven.

The aluminium oxide occurring corresponds in its purity substantially to the metallic aluminium used for etching. According to the present method, however, an even purer aluminium oxide may be obtained by purifying the pre-concentrated aluminium chloride solution of the accompanying elements of the aluminium foil by a crystallisation process. The aluminium chloride can be crystallised by further concentration of its solution and cooling. The crystallisation may alternatively be carried out in accordance with the chemical law of mass action by introducing the HCl gas produced during the roasting process directly into the etching bath if the latter already has an adequately high aluminium chloride and hydrochloric acid concentration or into the pre-concentrated aluminium chloride solution in the case of more dilute etching baths, or by any combinations of the operations of concentration, saturation and cooling. The resulting extremely pure crystalline aluminium chloride is separated, for example, by centrifuging, and may be roasted either directly or in mixture with recycled aluminium oxide.

If the etching bath contains other volatile acids, for example nitric acid, in addition to hydrochloric acid, regeneration of the etching bath may be carried out by the same method. The nitric acid then passes over into the distilled hydrochloric acid, is condensed together with the latter, and recovered. If necessary, the residual gases from distillation are washed with cooled etching or hydrochloric acid to recover the nitric acid.

Other additives, such as common salt, or accompanying metals originating from the aluminium, for example iron, do not interfere with the process. Any non-volatile compounds pass into the aluminium oxide and are thus removed from the etching bath.

The regeneration of the etching acid may be carried out discontinuously. It is more advantageous, however, to use the continuous mode of operation, the amount of etching acid being removed from the etching installation and applied to the regeneration plant always being equivalent to the amount of aluminium dissolving, the aliquot quantity of regenerated hydrochloric acid flowing back to the same degree. As a result of the continuous extraction and return the concentration of etching acid in the etching plant always remains constant. Etching can therefore be carried out under constant conditions and with maximum hydrochloric acid concentrations, since all the acid is recovered. The use of high acid concentrations was hitherto impossible for economic reasons.

This together with excellent economy and the avoidance of noxious waste liquors form the industrial advantages of the method.

I claim:
1. A method of regenerating the partially spent hydrochloric acid used as etching liquid in aluminium etching baths comprising the steps of withdrawing a portion of the etching liquid containing free and partially spent hydrochloric acid and aluminium chloride solution, distilling said liquid to recover and condense hydrochloric acid, reacting the remaining aluminium chloride solution with aluminium oxide to form a solid aluminium oxide compound, roasting said compound to form aluminium oxide and $HCl-H_2O$ gases, and condensing the roast $HCl-H_2O$ gases to form aqueous hydrochloric acid.

2. A method of regenerating the partially spent hydrochloric acid used as etching liquid in aluminium etching baths comprising the steps of withdrawing a portion of the etching liquid containing free and partially spent hydrochloric acid and aluminium chloride solution, distilling said liquid to recover and condense hydrochloric acid, concentrating the remaining aluminium chloride solution, reacting the remaining aluminium chloride solution with aluminium oxide to form a solid aluminium chloride oxide compound, roasting said compound to form aluminium oxide and $HCl-H_2O$ gases, and condensing the roast $HCl-H_2O$ gases to form aqueous hydrochloric acid.

3. The method according to claim 2 wherein the vapor of HCl and water distilling from the etching liquid are simultaneously subjected to further distillation in order to concentrate the HCl and to separate excess water therefrom.

4. A method according to claim 2, wherein the reaction between the concentrated aluminium chloride solution and the aluminium oxide is carried out in the same roasting oven as the roasting process.

5. A method according to claim 1, characterised in that the hydrochloric acid condensed in the first step of the method is used for condensing the roasted $HCl-H_2O$ gases to form aqueous hydrochoric acid.

6. A method according to claim 2 wherein aluminium chloride is crystallised from the aluminium chloride solution before roasting with aluminium oxide to form the solid aluminium chloride oxide compound.

7. A method according to claim 6, characterised in that the crystallisation of the aluminium chloride is carried out by use of $HCl-H_2O$ gases resulting from said roasting to saturate the aluminium chloride concentrate with HCl gas.

References Cited in the file of this patent
UNITED STATES PATENTS

| | | |
|---|---|---|
| 1,865,797 | Shiffler | July 5, 1932 |
| 2,378,052 | Waldman et al. | June 12, 1945 |
| 2,413,709 | Hoffman | Jan. 7, 1947 |

OTHER REFERENCES

Journal of the American Chemical Society, vol. 76, No. 9, 1954, page 2560.